United States Patent
Wang

(10) Patent No.: US 10,812,247 B2
(45) Date of Patent: Oct. 20, 2020

(54) METHODS AND NETWORK NODES FOR SCHEDULING A PLURALITY OF TTI-BUNDLE TRANSMISSIONS

(71) Applicant: TELEFONAKTIEBOLAGET LM ERICSSON (PUBL), Stockholm (SE)

(72) Inventor: Jun Wang, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/312,714

(22) PCT Filed: Jul. 6, 2016

(86) PCT No.: PCT/IB2016/054050
§ 371 (c)(1),
(2) Date: Dec. 21, 2018

(87) PCT Pub. No.: WO2018/007851
PCT Pub. Date: Jan. 11, 2018

(65) Prior Publication Data
US 2019/0319770 A1    Oct. 17, 2019

(51) Int. Cl.
*H04W 4/00* (2018.01)
*H04L 5/00* (2006.01)
*H04L 1/00* (2006.01)
*H04L 1/18* (2006.01)
*H04W 72/04* (2009.01)
*H04W 72/14* (2009.01)

(52) U.S. Cl.
CPC .......... *H04L 5/0082* (2013.01); *H04L 1/0038* (2013.01); *H04L 1/1809* (2013.01); *H04L 1/1835* (2013.01); *H04L 5/0055* (2013.01); *H04W 72/042* (2013.01); *H04W 72/14* (2013.01)

(58) Field of Classification Search
CPC .. H04W 72/042; H04W 76/27; H04L 5/0053; H04L 5/0048; H04L 5/0007
See application file for complete search history.

(56) References Cited

U.S. PATENT DOCUMENTS

2007/0079207 A1*  4/2007  Seidel ............... H04L 1/1845
                                                714/748
2009/0290559 A1* 11/2009  Pelletier ............ H04L 1/189
                                                370/336

(Continued)

OTHER PUBLICATIONS

3GPP TSG RAN WG2, Meeting #83bis, "Support of Dynamic Scheduling of TTI Bundle Transmissions"; Ljubljana, Slovenia; Oct. 7- 10, 2013.

*Primary Examiner* — Atique Ahmed
(74) *Attorney, Agent, or Firm* — Sage Patent Group

(57) ABSTRACT

A method for transmitting data by a user equipment (UE) over a plurality of Transmission Time Interval, TTI, bundles in a communication network is provided. The method comprises: receiving a single control message indicating a uplink scheduling grant for data transmissions; determining a number of TTI-bundles, scheduled for the data transmissions of the UE in accordance with the received control message; and sending the data to the communication network, using the determined number of TTI-bundles. A user equipment for implementing the method is also provided.

17 Claims, 14 Drawing Sheets

(56) References Cited

U.S. PATENT DOCUMENTS

| | | | |
|---|---|---|---|
| 2010/0246491 A1* | 9/2010 | Bae | H04L 1/1835 370/328 |
| 2011/0310777 A1* | 12/2011 | Jiang | H04W 72/04 370/280 |
| 2012/0057560 A1* | 3/2012 | Park | H04L 1/08 370/329 |
| 2012/0155337 A1* | 6/2012 | Park | H04L 1/1692 370/280 |
| 2013/0128847 A1* | 5/2013 | Wang | H04L 1/0025 370/329 |
| 2014/0056237 A1* | 2/2014 | Eriksson | H04L 1/0009 370/329 |
| 2014/0198664 A1 | 7/2014 | Chen et al. | |
| 2014/0286255 A1* | 9/2014 | Nam | H04L 1/1861 370/329 |
| 2015/0029903 A1 | 1/2015 | Chen et al. | |
| 2015/0103749 A1* | 4/2015 | Kela | H04L 1/1835 370/329 |
| 2015/0109972 A1* | 4/2015 | Khoryaev | H04W 72/0446 370/280 |
| 2016/0073402 A1 | 3/2016 | Eriksson et al. | |
| 2016/0164643 A1* | 6/2016 | Loehr | H04L 1/1854 370/336 |
| 2016/0212761 A1* | 7/2016 | Li | H04L 1/1822 |
| 2017/0171866 A1* | 6/2017 | Cheng | H04W 72/0426 |

\* cited by examiner

METHODS AND NETWORK NODES FOR SCHEDULING A PLURALITY OF TTI-BUNDLE TRANSMISSIONS

TECHNICAL FIELD

This disclosure relates generally to methods and network nodes for scheduling the transmissions of a plurality of Transmission Time Interval (TTI)-bundles in a communication network.

BACKGROUND

Coverage represents a primary requirement of cellular radio communication systems. For example, the desired service coverage and quality set limits on how sparsely network radio nodes can be deployed and where they can be deployed. Coverage requirements therefore directly affect deployment costs.

As such, in the Long Term Evolution (LTE) standard defined by the Third Generation Partnership Project (3GPP), coverage is an important design parameter. For example, as more operators deploy Voice over Long Term Evolution (VoLTE), the requirements for good coverage and high capacity have to be met. Good coverage and high capacity allow the VoLTE calls to keep the delay and jitter within acceptable limits.

More specifically, Release 8 (Rel. 8) of the LTE standard introduced the Transmission Time Interval (TTI) bundling technique to improve coverage.

The TTI bundling technique is an uplink (UL) technique used by a User Equipment (UE) to send a transport block multiple times in consecutive sub-frames without waiting for Hybrid Automatic Repeat reQuest (HARQ) Acknowledgement/Negative-Acknowledgement (ACK/NACK) messages. For example, TTI bundling enables up to 4 redundant versions of the same transport block to be sent in 4 consecutive UL sub-frames, before a final ACK/NACK is fed back from the eNode B (eNB). The eNB sends the final ACK/NACK to the UE after receiving all the four redundancy versions of the transport block. Combined processing of the different redundant transmissions over multiple sub-frames can greatly increase the successful rate of decoding the UL transport block from the UE. This is particularly true when the UEs are at a cell boundary, with limited power. As such, TTI-bundling improves the UL coverage and shortens the delay for VoLTE.

However, the current systems need further improvements as VoLTE requires good coverage and high capacity of the communication network.

SUMMARY

According to a first aspect of the invention, there is provided a method, at a network node, for scheduling resources for a user equipment (UE) to transmit data in a communication network. The method comprises: determining a number of Transmission Time Interval (TTI)-bundles based at least on an amount of data to be transmitted from the UE; and sending a single control message to the UE, the control message indicating a uplink scheduling grant for transmissions of the determined number of TTI-bundles.

According to a second aspect of the invention, there is provided a method for transmitting data by a user equipment (UE) using a plurality of Transmission Time Interval, TTI, bundles in a communication network. The method comprises: receiving a single control message indicating a uplink scheduling grant for data transmissions; determining a number of TTI-bundles, allocated for the data transmissions of the UE, in accordance with the received control message; and sending the data to the communication network, using the determined number of TTI-bundles.

According to a third aspect of the invention, there is provided a network node for scheduling resources for a user equipment (UE) to transmit data in a communication network. The network node comprises a processing circuitry adapted to cause the network node to: determine a number of Transmission Time Interval (TTI)-bundles based at least on an amount of data to be transmitted from the UE; and send a single control message to the UE, the control message indicating a uplink scheduling grant for transmissions of the determined number of TTI-bundles.

According to a fourth aspect of the invention, there is provided a User Equipment (UE) for transmitting data over a plurality of Transmission Time Interval, TTI, bundles in a communication network. The UE comprises a processing circuitry adapted to cause the UE to: receive a single control message indicating a uplink scheduling grant for data transmissions; determine a number of TTI-bundles, scheduled for the data transmissions of the UE in accordance with the received control message; and send the data to the communication network, using the determined number of TTI-bundles.

According to a fifth aspect of the invention, there is provided a network node for scheduling resources for a user equipment (UE) to transmit data in a communication network. The network node comprises: a determining module configure to determine a number of Transmission Time Interval (TTI)-bundles based at least on an amount of data to be transmitted from the UE; and a sending module configured to send a single control message to the UE, the control message indicating a uplink scheduling grant for transmissions of the determined number of TTI-bundles.

According to a sixth aspect of the invention, there is provided a User Equipment (UE) for transmitting data over a plurality of Transmission Time Interval, TTI, bundles in a communication network. The UE comprises: a receiving module configured to receive a single control message indicating a uplink scheduling grant for data transmissions; a determining module configured to determine a number of TTI-bundles, scheduled for the data transmissions of the UE in accordance with the received control message; and a sending module configured to send the data to the communication network, using the determined number of TTI-bundles.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
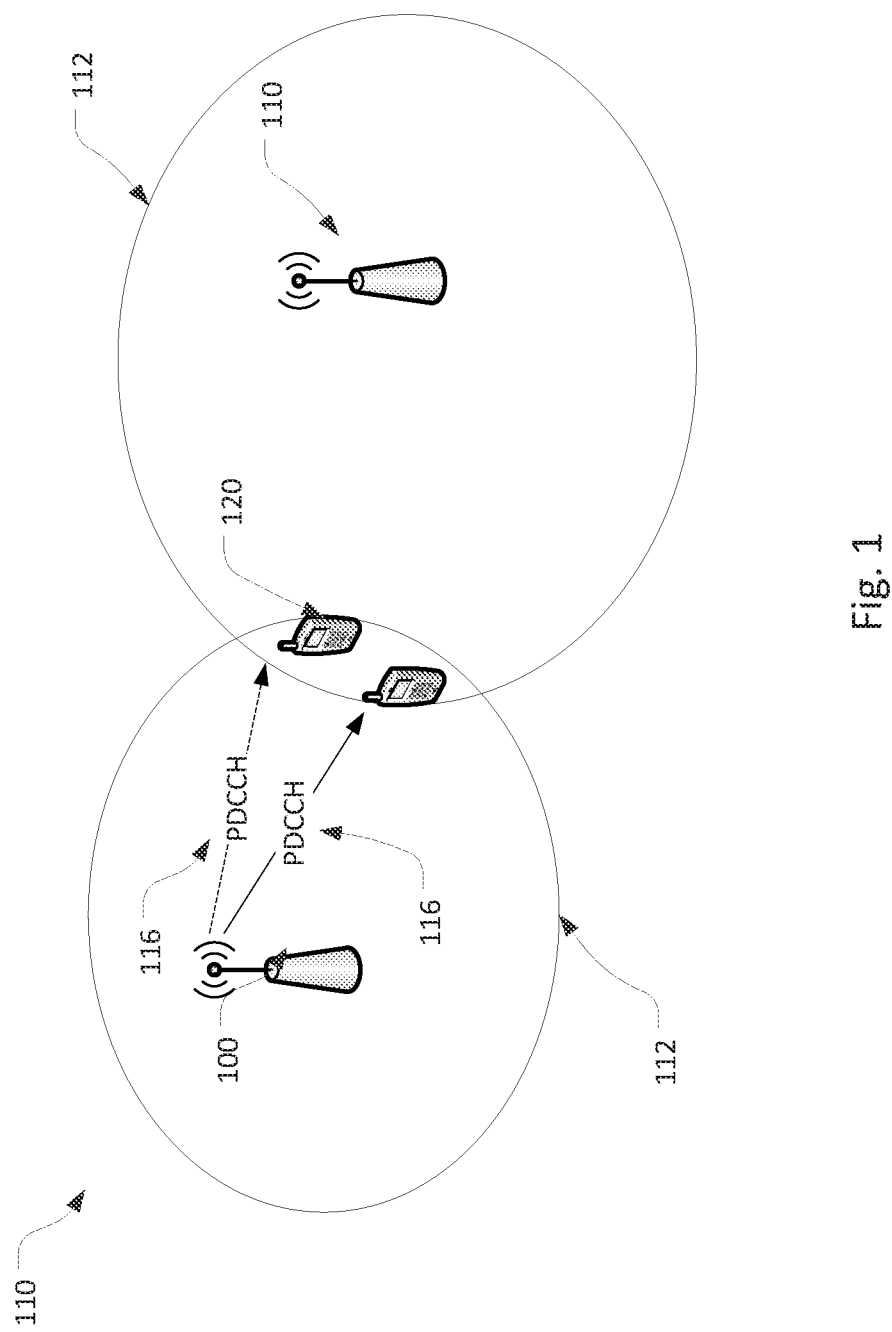
FIG. 1 illustrates a schematic diagram of a radio access network.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Multiple TTI-Bundle Transmissions

In the release 8 of the LTE standard, the allocated Physical Resource Block (PRB) number is limited to three and the modulation order is limited to Quadrature Phase Shift Keying (QPSK) for a TTI-bundle transmission. This means that at most 57 bytes can be transmitted using 3 PRBs. Thus, for a standard 1500 byte Internet Protocol (IP) packet, the User Equipment (UE) needs 26 TTI-bundles to transmit the IP packet. The constraints imposed on the PRB number and modulation for the TTI-bundle limit the Transport Block (TB) size of one TTI-bundle transmission. In the case of the VoLTE scenario, the user traffic pattern usually involves a mix-mode of traffic data, including Guaranteed Bit Rate (GBR) data, such as voice/video data, and other Non-GBR data. As such, the UE requires multiple TTI-Bundle scheduling grants to completely convey all its data to the eNB. In other words, a plurality or "bundle" or "group" of TTI-bundles is needed to transmit all the UE VoLTE traffic.

In the current systems, for each TTI-bundle transmission, one scheduling grant is signaled using one control message. Since the VoLTE traffic requires a plurality of TTI-bundle transmissions, then a plurality of scheduling grants need to be signaled to the UE 120. As such, for the VoLTE traffic, a large signaling overhead is caused by the multiple TTI-bundle scheduling grants that are needed for both the GBR and non-GBR data transmissions.

Although the constraints concerning the PRB number and modulation are removed in Release 12 of the LTE standard for some advanced UEs, the resource allocation constraints still exist implicitly. Indeed, the TTI-bundling technique is usually enabled for UEs at the cell edge, where the UEs suffer from deeper signal fading effect and limited power headroom. To guarantee a high decoding success rate, the eNBs usually do not allocate a large number of PRBs and a higher modulation order.

Therefore, the need for allocating multiple scheduling opportunities (i.e. TTI-bundles) to grant UEs sufficient uplink transmission capacity for VoLTE and mix-mode traffic still exists. As such, the need to decrease the signaling overhead caused by the scheduling grant of the multiple TTI-bundle transmissions still exists as well.

Furthermore, since the TTI-bundling technique is usually enabled for UEs located at the cell edge (to improve coverage of the cell), the UEs need a large Control Channel Element (CCE) aggregation level, i.e. CCE-8, to thwart the poor air conditions so as to guarantee the correct reception of the uplink scheduling grant. However, when the UEs are in the TTI-bundle mode and use large CCE resources, the overall capacity of the cell is impacted. As such, it is hard for the current systems to simultaneously meet the good coverage and high capacity/quality requirements for VoLTE.

Embodiments of this disclosure can mitigate the above described problems. For example, they provide a method for scheduling multiple TTI-Bundling opportunities in one scheduling signal or message.

Before going into details of the embodiments, first the architecture of a radio access network of a communication network will be described with reference to FIG. 1.

The radio access network (RAN) 100 of FIG. 1 could be the Evolved Universal Terrestrial Radio Access Network (E-UTRAN) in the LTE communication network. RAN 100 comprises a base station, such as an eNodeB 110 and a User Equipment 120 located in a cell 112 and connected to the eNodeB 110. There may be a plurality of UEs 120 located in the cell 112, even though only two are illustrated in FIG. 1. Furthermore, there may be a plurality of cells 112 for forming the RAN 100. An eNodeB 110 can be located in each cell.

The UE 120 could be a mobile or wireless device, terminal device, communication device, mobile phone, smartphone, tablet, laptop, Voice over Internet Protocol (VoIP) phone or handset, cellphone, Personal Digital Assistant (PDA), or any device which is able to send and receive data and/or signals to and from a network node, such as the eNB 110.

In the case of the conventional TTI-bundling mode, the eNB 110 will send a control signal/message, such as the Physical Downlink Control Channel (PDCCH), in which the resource allocation for a single TTI bundle transmission is indicated. Once the UE 120 receives this message, it decodes it so it can send its data using the allocated resources. More specifically, the PDCCH 116 carries the Downlink Control Information format zero (DCI0), which indicates UL scheduling grants to the UE 120. The UL scheduling grants contain information needed by the UE 120 to transmit its data to the network. In the conventional TTI-bundling mode, one control message is used to schedule one TTI-bundle transmission. Therefore, if a number of different TTI-bundle transmissions need to be granted, then the same number of control messages need to be sent to the UE, the number being superior to one, for example.

According to embodiments of the present disclosure, a plurality of TTI-bundle transmissions can be scheduled using only one control message or one single scheduling grant. In some embodiments, a plurality of consecutive TTI-Bundle transmissions are scheduled using one single scheduling grant. In other embodiments, a plurality of non-consecutive TTI-bundle transmissions are scheduled using a single scheduling grant.

In order to signal a plurality of TTI-Bundle transmissions in one control message, a new parameter is introduced in the DCI0. The new parameter is referred to as the TTI-Bundle Scheduling Number (TBSN). The TBSN indicates the number of TTI-bundle transmissions granted to the UE 120.

More specifically, according to 3GPP TS 36.212, section 5.3.3.1.1, there are $\lceil \log_2(N_{RB}^{UL}(N_{RB}^{UL}+1)/2 \rceil$ bits used for the resource block assignment and hopping resource indicator in the DCI0, where $N_{RB}^{UL}$ is the number of resource blocks for the uplink transmission and $\lceil \ \rceil$ is the ceiling function.

The resource block assignment and hopping resource indicator consists of a resource indication value (RIV), which is a resource allocation field in the scheduling grant. For example, the RIV indicates the starting resource block ($RB_{START}$), length for contiguously allocated resource blocks ($L_{CRBs} \geq 1$) and frequency hopping indication (see 3GPP TS36.213 section 8.1).

The actual value of the RIV field is defined by:
if $(L_{CRBs}-1) \leq \lfloor N_{RB}^{UL}/2 \rfloor$ then $$RIV = N_{RB}^{UL}(L_{CRBs}-1) + RB_{START} \qquad \text{Equation (1)}$$

Else $$RIV = N_{RB}^{UL}(N_{RB}^{UL} - L_{CRBs}+1) + (N_{RB}^{UL}-1-RB_{START}) \qquad \text{Equation (2)}$$

where $\lfloor \ \rfloor$ is the floor function.

Figure 2:
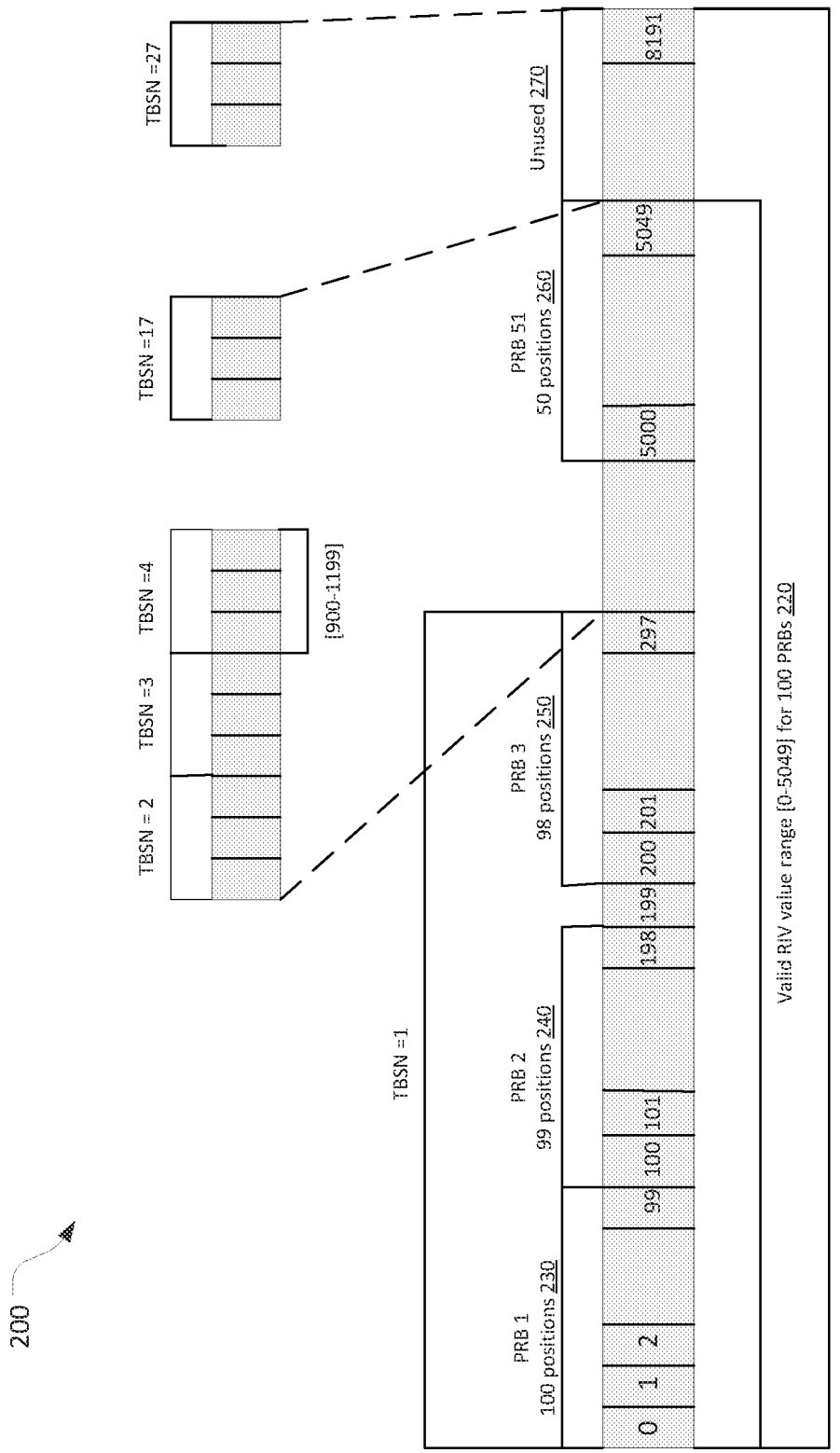
FIG. 2 illustrates a diagram of the Resource Indication Value (RIV) value range, according to an embodiment.

FIG. 2 gives an overview (200) of the value range and usage of the RIV for a 20 MegaHertz (20 MHz) bandwidth system with non-hopping Physical Uplink Scheduling Channel (PUSCH), for example. In this case, the RIV consists of 13 bits (210), and as such, it can represent a maximum value range of $2^{13}$=[0-8191], among which only [0-5049] (220) are valid values considering that maximum $L_{CRBs}$=100.

Furthermore, the first 100 positions (230) indicate the allocation of one PRB (PRB 1), the next 99 (240) positions (from 100 to 198) indicate the allocation of two PRBs (PRB 2), positions 200 to 297 (250) indicate the allocation of three PRBs (PRB 3) and so on until the positions 5000 to 5059 (260) which indicate the allocation of 51 PRBs (PRB 51). It should be noted that the RIV value range after 5049 is not used (270).

Now, if it is assumed that the eNB 110 allocates a maximum of 3 PRBs for each TTI-bundle transmission to the UE, due to poor air conditions for example, then the valid value range of the RIV will further shrink to [0-297] as can be seen in FIG. 2. As mentioned earlier, [0-99] is used for PRB 1, [100-198] is used for PRB 2 ([199] value is reserved) and [200-297] is used for PRB 3.

From the above observation, it can be seen that although 13 bits, representing a value range of [0-8191], are reserved for the RIV field, only a small portion ([0-297]) of the value range is used for indicating/allocating resources for a TTI-bundle transmission to the UE 120. This is due to the PRB constraint, i.e. a maximum of 3 PRBs is used. Therefore, it is possible for the eNB 110 to use the unused value range of the RIV field to indicate the TTI-Bundle scheduling Number (TBSN) according to an embodiment.

More specifically, in FIG. 2, it is shown that with 13 bits, TBSN=27 can be indicated. In other words, with 13 bits, a maximum of 27 TTI-bundle transmissions can be scheduled/allocated, each TTI-bundle transmission using 3 PRBs. However, depending on air conditions and the amount of traffic to be transmitted from the UE 120, the eNB 110 can decide to schedule any number of TTI-bundle transmissions between 1 and 27.

More specifically, TBSN can be calculated as follows:

$$TBSN = \left\lfloor \frac{RIV_{rcv}}{RIV_{maxtti-b}} \right\rfloor + 1 \qquad \text{Equation (3)}$$

where $RIV_{rcv}$ is the actual value of the RIV field in the received DCI0 and $RIV_{max\ tti-b}$ is the maximum valid RIV value for the TTI-bundle transmission. $RIV_{max\ tti-b}$ is defined as: $RIV_{max\ tti-b} = PRB_{max}^{UL} \times PRB_{max}^{TTI-B}$, where $PRB_{max}^{UL}$ refers to the maximum number of PRB allocated for the uplink, and $PRB_{max}^{TTI-B}$ refers to the maximum number of PRB allocated for the TTI-bundle transmission.

For a 20 MHz bandwidth system, $PRB_{max}^{UL}$=100, and with the assumption that at most 3 PRBs are used for the TTI-bundle transmission (e.g. PRB constraint), then $PRB_{max}^{TTI-B}$=3. Therefore, $RIV_{max\ tti-b}$=100*3=300.

For example, if a UE 120 receives the DCI0 in which the value of [900] is given in the RIV field, it can calculate the TSBN according to equation 3. For example, TBSN=900/300+1=4. As such, the UE 120 knows that 4 TTI-bundle transmissions have been granted for transmitting its data, each TTI-bundle transmission comprising 4 sub-frames.

Also, the RIV field in DCI0 is redefined to include the TBSN. As such, equations 1 and 2 are changed to:
if $(L_{CRBs}-1) \leq \lfloor N_{RB}^{UL}/2 \rfloor$ then $$RIV = N_{RB}^{UL}(L_{CRBs}-1) + RB_{START} + (TBSN-1) \times RIV_{max\ tti-b} \qquad \text{Equation (4)}$$

else $$RIV = N_{RB}^{UL}(N_{RB}^{UL} - L_{CRBs}+1) + (N_{RB}^{UL}-1-RB_{START}) + (TBSN-1) \times RIV_{maxtti-b} \qquad \text{Equation (5)}$$

Furthermore, an effective RIV ($RIV_{effective}$), which is used to indicate which PRB numbers are allocated to the UE for transmitting its data and a start position value, can be computed as follows:

$$RIV_{effective} = RIV_{rcv} \bmod RIV_{max\ tti-b} \qquad \text{Equation (6)}$$

where mod is the modulo function.

Upon receiving the DCI0, the UE 120 can derive the TBSN and effective RIV using equations 3 and 6 respectively.

After calculating the effective RIV, the UE 120 can deduce the RB start position and allocated PRB numbers according to equations 4 and 5.

For example, let's assume that the eNB 110 allocates 3 PRBs such as [5, 6, 7] to the UE 120 for the TTI-bundle transmissions. Also, the eNB 110 determines to grant 4 consecutive TTI-bundles for the UE's uplink PUSCH transmission. Therefore, the "Resource block assignment and hopping resource allocation indicator" (RIV) in DCI0 should be set to:

$$RIV = N_{RB}^{UL}(L_{CRBs}-1) + RB_{START} + (TBSN-1) \times RIV_{max\ tti-b} = 100 \times (3-1) + 5 + 300 \times (4-1) = 1105.$$

Upon successfully decoding the DCI0 message, the UE calculates TBSN=4 using equation 3, i.e.

$$TBSN = \left\lfloor \frac{1105}{300} \right\rfloor + 1 = 4,$$

therefore 4 consecutive TTI bundles have been allocated for its uplink PUSCH transmission. The effective RIV is calculated according to equation 6, i.e. $RIV_{effective}$=1105 mod 300=205, indicating PRBs [5, 6, 7] are allocated for the subsequent 4 TTI bundles transmission. For example, a RIV of 200 would indicate that PRBs [0, 1, 2] are allocated for the TTI bundle transmissions. A RIV of 201 would indicate that PRBs [1, 2, 3] are allocated for the TTI bundle transmissions. A RIV of 202 would indicate that PRBs [2, 3, 4] are allocated for the TTI bundle transmissions. A RIV of 203 would indicate that PRBs [3, 4, 5] are allocated for the TTI bundle transmissions and a RIV of 204 would indicate that PRBs [4, 5, 6] are allocated for the TTI bundle transmissions.

In general, a 20 MHz bandwidth system with non-hopping PUSCH, the maximum UV value is 8192 (since 13 bits are given to the IV field), then a maximum of $$\left\lfloor \frac{8192}{300} \right\rfloor = 27$$

TTI-bundle transmissions can be granted using one DCI0 message.

For a 20 MHz bandwidth system with frequency hopping, 2 bits are used to indicate hopping information, as such, the RIV field consists of 11 bits and the maximum RIV value is $2^{11}$. Accordingly, the maximum TBSN is reduced to $$\left\lfloor \frac{2^{11}}{300} \right\rfloor = 7.$$

When compared with the conventional TTI-bundle transmission, the embodiments of this disclosure can achieve a decrease in the signaling cost of $26/27=96.4\%$ and $6/7=85.7\%$ respectively for the non-frequency hopping case and the frequency hopping case. Indeed, in the non-frequency hopping case, to schedule 27 TTI-bundle transmissions, in the current systems 27 control messages are needed, whereas with the embodiments of the present disclosure, only one control message is needed. In the same manner, for the frequency hopping case, 7 control messages are used for scheduling 7 TTI-bundle transmissions in the current systems. In contrast, in the embodiments of this disclosure, only one control message can be used.

In most cases, the radio condition of a specific UE will not change too fast considering that the UE has a low moving speed. Therefore, the selected Modulation Coding Scheme (MCS) based on the radio conditions can be kept effective or similar during a relatively long period (hundreds of milliseconds) compared to one TTI-bundle scheduling (4 ms). As such, it is possible to use a single control message to schedule/allocate resources to a number of different TTI bundle transmissions.

In the above examples, DCI0 has been used to indicate the UL scheduling grant TBSN. However, it should be noted that from Release 10 of the LTE standard, a new DCI (i.e. DCI format 4 (DCI4)) has been introduced for also indicating UL scheduling grants. Therefore, the control message could be a DCI0 or a DCI4 or any other appropriate Downlink Control Information message, each of which can include the TSBN for indicating a number of TTI-bundles for transmission of the UE's data.

Now turning to FIG. 3, a signaling flow 300 between the eNB 110 and the UE 120 will be described for allocating a number of TTI-bundle transmissions, according to an embodiment.

It is assumed that the UE 120 is at the edge of a cell 112 (see FIG. 1) and as such TTI-bundling should be enabled, particularly if the UE 120 initiates a VoLTE call. For example, an intra-cell handover is triggered using a command message for enabling the TTI bundling. The command message could be the Resource Radio Control (RRC) Connection Reconfiguration message with includes a parameter for enabling TTI-bundling and an optional parameter maxPRBAllocationNum to indicate the maximum allowed PRB number allocated to the UEs for TTI-bundle transmissions. As such, in step 310, the eNB 110 sends a RRC connection reconfiguration message to the UE 120, in which the feature of TTI-bundling is enabled and the maximum number of PRB allocation (maxPRBAllocationNum) is given. For example, the maximum number of PRB allocation for each TTI-bundle transmission is set to 3 (maxPRBAllocationNum=3).

In step 320, the UE 120 sends a random preamble to the eNB 110 in order to access the network and to identify itself.

In step 330, the eNB 110 sends a Random Access Response (RAR) to the UE 120, in response to the received preamble. In the RA response, the eNB 110 also assigns a new identity to the UE 120, such as the Cell Radio Network Temporary Identifier (C-RNTI).

In step 340, the UE 120 sends a Message 3 (Msg3) to the eNB 110 as confirmation of reception of RAR. When the UE 120 detects the parameter maxPRBAllocationNum in the received RRC Connection Reconfiguration message, the UE 120 knows that the feature for multiple TTI-bundle transmissions is activated. As such, the UE 120 will apply the multiple TTI-bundling feature in the subsequent UL transmissions, then synchronization is achieved between the eNB 110 and the UE 120.

In step 350, after the reception of Msg3, the eNB 110 knows that it has achieved UL synchronization with UE which has the multiple TTI-Bundling feature enabled and sends an Acknowledgement (ACK) to the UE 120. This means that the next UL scheduling should be for a TTI-bundle transmission.

Now assume that at System Frame Number (SFN)=n−1, each SFN comprising 10 ms, the eNB 110 sends a control message (DCI0) comprising an uplink grant to the UE 120 (step 360). For example, the eNB 110 decides at first to schedule only one TTI-bundle transmission (over 4 sub-frames) at SFN=n. As such, TBSN is equal to 1, and is equivalent to the case of the conventional single TTI-bundle transmission over 4 sub-frames, and the RIV value is limited to [0-297] according to equation 1 or 2. When the UE 120 receives the uplink grant, it retrieves the RIV value from the DCI0 (which falls into the conventional used range value of [0-297]) and inputs it into equation 3 to get TBSN=1. Therefore, the UE 120 identifies it as a conventional TTI-bundle and it should send only one TTI-bundle at SFN=n.

At SFN=n, the UE 120 transmits the scheduled TTI-bundle, referred to as the Nth bundle, at step 370, over 4 sub-frames.

At SFN=n+1, the eNB sends a Negative ACK (NACK) to the UE using the Physical HARQ Indicator Channel (PHICH), in step 380, assuming that the decoding of the Nth bundled transmission at the eNB 110 has failed. The reception of the NACK by the UE is an indication for the UE to retransmit the Nth bundled data on SFN=n+2.

At SFN=n+2, the UE 120 resends the Nth bundle in step 390.

At SFN=n+2, the eNB 110 decides, for example, to schedule/allocate four consecutive bundle transmissions, at step 400. This decision can be based on factors such as the amount of the remaining/pending data of the UE 120 to be transmitted, air conditions, etc. To schedule the 4 TTI-bundle transmissions, the eNB 110 sends a control message to the UE 120, such as the DCI0, in which the RIV field has a value that indicates that TBSN=4. For example, the value in the RIV field is 900. Upon receiving the DCI0, The UE 120 calculates the TBSN using equation 3, i.e. TSBN=4= (900/3+1). Then, the UE 120 knows it can send 4 TTI-bundle transmissions in 4 consecutive SFNs (from SFN=n+3 to SFN=n+6), for example. Furthermore, the UE 120 can derive the effective RIV according to equation 6 and then determine the Resource Block (RB) start position and allocated PRB numbers according to equation 4 or 5.

At SFN=n+3, the UE starts transmitting the first bundle of data out of the 4 bundles using the PUSCH, at 410 step. This new TTI-bundle transmission triggers a corresponding HARQ process. This transmission is considered to be the first PUSCH bundle transmission.

It is assumed that when the eNB 110 receives the first bundle, it fails to decode it. As such, the eNB 110 will feed back a NACK to the UE 120. The eNB 110 will also store the first bundle of data, contained in a transport block, into the HARQ buffer.

At SFN=n+4, the UE 120 sends the second bundle of data out of the 4 bundles using the PUSCH, at step 420. This transmission is considered to be the second PUSCH bundle transmission.

At SFN=n+4, the eNB 110 sends the NACK to the UE regarding the decoding failure of the first bundle, at step 430.

At SFN=n+5, after receiving the NACK of step 430, the UE retransmits the first bundle to the eNB, at step 440. This retransmission is considered to be the third PUSCH bundle transmission.

At SFN=n+5, the eNB sends an ACK to the UE, after decoding successfully the second bundle, at step 450.

At SFN=n+6, the UE transmits the third bundle of data to the eNB, in step 460. This transmission is considered to be the fourth PUSCH bundle transmission.

At SFN=n+6, the eNB sends an ACK for the first bundle that was retransmitted at SFN=n+5, in step 470.

At SFN=n+7, assuming that the eNB has successfully decoded the third bundle, it sends an ACK to the UE, in step 480.

It should be noted that in this example, the eNB 110 has scheduled four consecutive TTI bundle transmissions, in which 3 bundles are new transmissions and one bundle is a retransmission.

Also, it should be appreciated that SFNs have been taken as a time reference for the different transmissions in the above example, however, other time references could be used as well.

Figure 4:
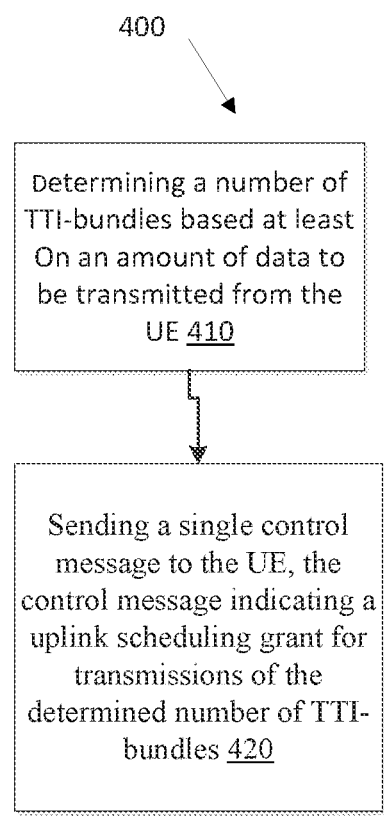
FIG. 4 illustrates a flow chart for a method of scheduling a plurality of TTI-bundle transmissions in a communication network, according to an embodiment.

Now turning to FIG. 4, a flow chart of a method 400 for scheduling resources, for a user equipment (UE) to transmit data in a communication network, will be described. The method can be performed or implemented by a network node, such as an eNB 110, for example.

Method 400 starts with determining a number of TTI-bundles based on an amount of data to be transmitted by the UE (block 410). The amount of data can be pending data in the UE buffer. The UE sends periodically or on demand a buffer status report (BSR) to the eNB 110 to update the eNB 110 regarding its pending data. Based on the received BSR, the eNB 110 knows the amount of data that the UE 120 wants to transmit. Furthermore, the number of TTI-bundles can be determined based on other factors, such as a quality of channel of the UE, a UE's moving speed, collision with other scheduled PRBs, etc.

In block 420, a single control message is sent to the UE, the control message indicating an uplink scheduling grant for transmission of the determined number of TTI bundles.

Once the UE 120 receives the single control message, it can decode the control message and starts transmitting data according to the decoded control message, i.e. using the allocated resources for transmitting the determined number of TTI-bundles. More specifically, the UE 120 can calculate the TBSN using the RIV field of the DCI0 control message, according to equation 3, and calculates the effective RIV according to equation 6. From the effective RIV, the start position (RBstart) and the number of allocated PRBs for the transmission of the determined number of TTI-bundles can be deduced, according to equations 4 and 5.

It should be noted that the determined number of TTI bundles is superior to one, according to some embodiments of the present disclosure. However, the number of TTI-bundles could be equal to one, in such a case, it is equivalent to the conventional TTI-bundling technique. As such, the embodiments of the present disclosure are compatible with legacy systems, where only one TTI-bundle (TBSN=1) is granted in one single control message.

In some embodiments, the number of TTI-bundles is also determined based on the actual air conditions for the UE 120, and on the size of the Transport Block (TB) for each TTI-bundle transmission, which depends on the Modulation and Coding Scheme (MCS) and PRB number. For example, the eNB 110 can determine the value of TBSN by using the following equation: TBSN=min {buffer data size/TB size, $FSN_{stability}$}, where $FSN_{stability}$ refers to the eNB's estimated period during which the UE's channel quality remains unchanged. Once the TBSN is determined, the eNB 110 encodes the TBSN value into the RIV field.

In some embodiments, the determined number of TTI bundles includes a number of consecutive TTI bundles.

In some other embodiments, the determined number of TTI bundles includes a number of non-consecutive TTI bundles. In this case, the value of the RIV field (i.e. TBSN) refers to an index of a mapping table, the mapping table providing a pattern for the data transmission of the determined number of non-consecutive TTI-bundles. The mapping table can be sent to the UE 120, when the UE 120 attaches to the network node, i.e. eNB 110, and when the TTI bundling is enabled.

Figure 5:
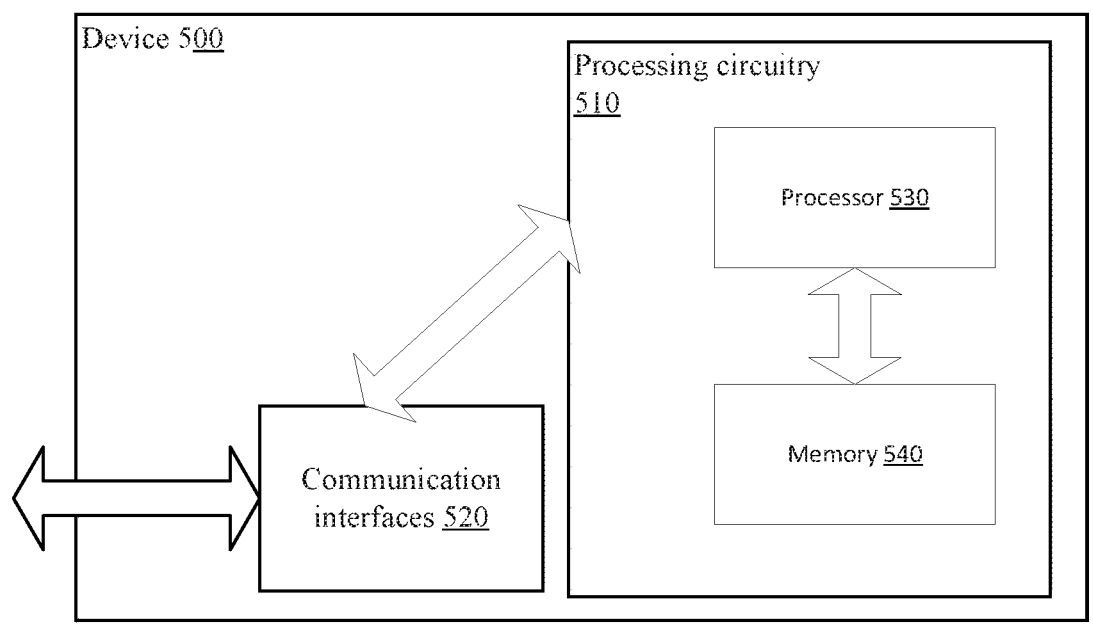
FIG. 5 illustrates a schematic network node for carrying out the method of FIG. 4, according to one embodiment.

FIG. 5 illustrates a network node 500 configured to perform method 400. The network node 500 could be the eNB 110 or other nodes in the communication network.

The network node 500 comprises a processing circuitry 510 connected to one or more communication interfaces 520.

The communication interface(s) 520 are configured to communicate with other network nodes, network elements or UEs, in the communication network.

The processing circuitry 510 comprises a processor 530 and a memory 540 connected thereto. The memory 540 may contain instructions that, when executed, cause the network node 500 to perform method 400, for example. As such, the processor 510 is configured to carry out method 400, as described above.

The memory 540 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

Furthermore, a computer program comprising non-transitory computer-readable storage medium storing instructions which, when executed by a processor, e.g. 530, of a network node, e.g. 500, may cause the network node 500 to carry out method 400 is provided. The instructions may be stored in the memory 540, for example.

It should be appreciated that the processing circuitry 510, when configured with appropriate program code, may be understood to comprise several functional "modules," where each module comprises program code for carrying out the corresponding function, when executed by an appropriate processor.

Figure 6:
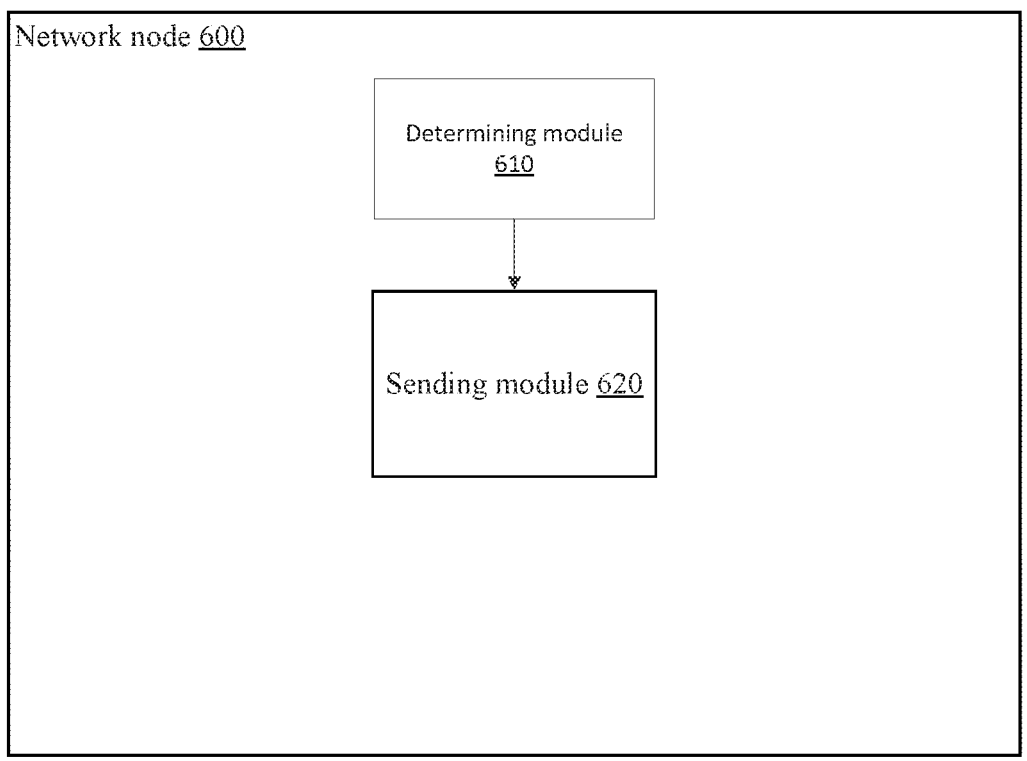
FIG. 6 illustrates a schematic network node for carrying out the method of FIG. 4, according to another embodiment.

Thus, for example, FIG. 6 illustrates a network node 600 adapted to carry out method 400, may be understood to comprise a determining module 610 and a sending module 620, according to another embodiment.

The determining module 610 is configured to determine a number of TTI-bundles based at least on an amount of data to be transmitted by the UE 120.

The sending module 620 is configured to send a single control message to the UE 120, the control message comprising an uplink scheduling grant for the transmissions of the determined number of TTI-bundles.

It should be appreciated by a person skilled in the art that the network nodes 500 and 600 may comprise other components, such as additional processors, memories, etc., for performing conventional functions of the network nodes, which are well-known in the art.

Figure 7:
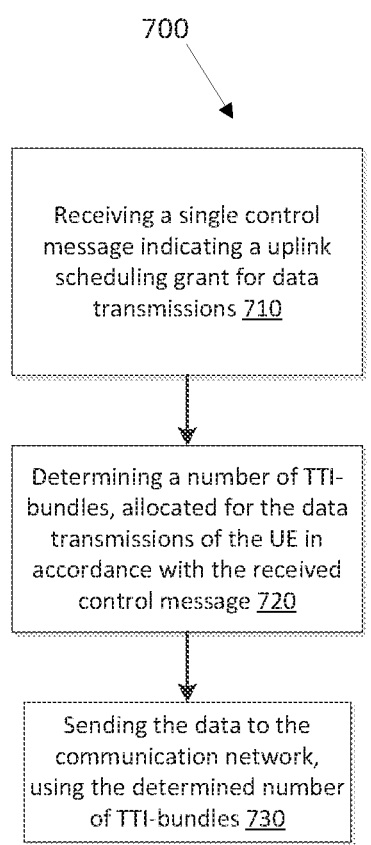
FIG. 7 illustrates a flow chart of a method for transmitting a plurality of TTI-bundles in a communication network, according to an embodiment.

FIG. 7 illustrates a flow chart of a method 700 for transmitting data by a UE using a plurality of Transmission Time Interval, TTI, bundles in a communication network. The method can be performed or implemented by the UE 120, for example.

Method 700 starts with receiving a single control message indicating an uplink scheduling grant for data transmissions (block 710).

In block 720, method 700 determines a number of TTI-bundles, scheduled for the data transmissions of the UE, in accordance with the received control message.

In block 730, method 700 sends the data to the communication network using the determined number of TTI-bundles.

It should be understood that the determined number of TTI-bundles refers to a number of different individual TTI-bundles, each of such TTI-bundles covers 4 sub-frames.

Furthermore, the received control message can be a Downlink Control Information format 0 (DCI0) or a DCI format 4 (DCI4), which includes a Resource Indication Value (RIV) field.

The RIV field provides for a TTI bundle Scheduling Number (TBSN), which indicates the number of determined TTI-bundles. The TBSN is calculated according to equation 3.

It should be noted that the determined number of TTI-bundles can include a number of consecutive TTI bundles, and the determined number of TTI-bundles can be used for retransmitting data.

Also, the determined number of TTI bundles can include a number of non-consecutive TTI bundles. In this case, the TBSN refers to an index of a mapping table, the mapping table providing a pattern for the data transmissions of the determined number of non-consecutive TTI bundles.

The mapping table is sent to the UE 210 when the UE 120 attaches to a network node of the communication network.

Figure 8:
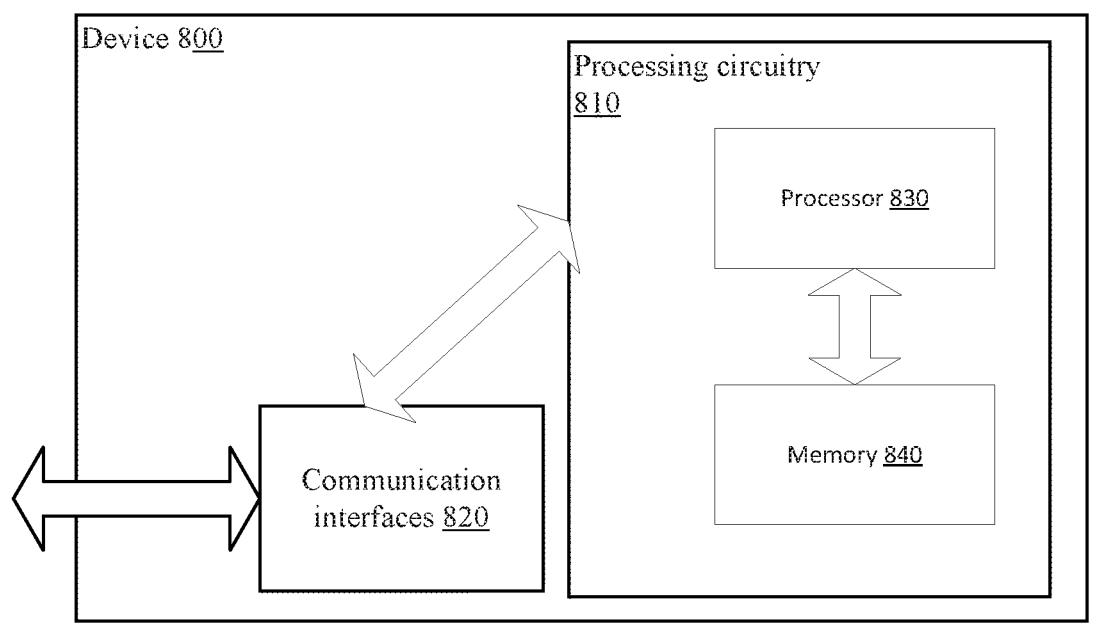
FIG. 8 illustrates a schematic diagram of a device, such as a UE, for carrying out the method of FIG. 7, according to one embodiment.

FIG. 8 illustrates a wireless device 800, such as a UE, etc., configured to perform the method 700, according to an embodiment.

The UE 800 comprises a processing circuitry 810 connected to one or more communication interfaces 820.

The communication interface(s) 820 are configured to communicate with other network nodes, network elements or wireless devices or UEs, in the wireless network.

The processing circuitry 810 comprises a processor 830 and a memory 840 connected thereto. The memory 840 may contain instructions that, when executed, cause the wireless device 800 to perform method 700, for example. As such, the processor 810 is configured to carry out method 700, as described above.

The memory 840 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

Furthermore, a computer program comprising non-transitory computer-readable storage medium storing instructions which, when executed by a processor, e.g. 830, of a wireless device, 800, cause the wireless device 800 to carry out method 700 is provided. The instructions may be stored in the memory 840, for example.

It should be appreciated that the processing circuitry 810, when configured with appropriate program code, may be understood to comprise several functional "modules," where each module comprises program code for carrying out the corresponding function, when executed by an appropriate processor.

Figure 9:
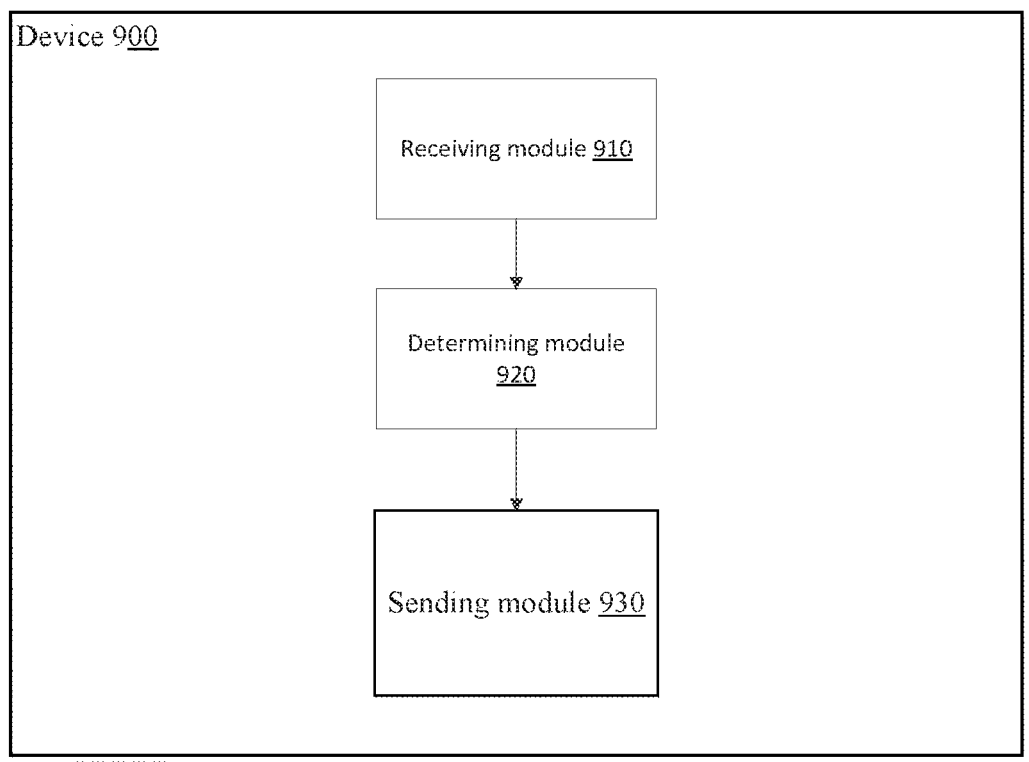
FIG. 9 illustrates a schematic diagram of a device, such as a UE, for carrying out the method of FIG. 7, according to another embodiment.

Thus, for example, FIG. 9 illustrates a wireless device 900, such as a user equipment, adapted to carry out method 700, may be understood to comprise a receiving module 910, a determining module 920 and a sending module 930, according to another embodiment.

The receiving module 910 is configured to receive a single control message from a network node, such as the eNB, the control message indicating a uplink scheduling grant for data transmissions.

The determining module 920 is configured to determine a number of TTI bundles, scheduled for the data transmissions of the UE, in accordance with from the received control message.

The sending module 930 is configured to send the data to the communication network, using the determined number of TTI-bundles.

It should be appreciated by a person skilled in the art that the network nodes 800 and 900 may comprise other components, such as additional processors, memories, etc., for performing conventional functions of the network nodes, which are well-known in the art.

As mentioned earlier, according to some embodiments, the TBSN can indicate a number of non-consecutive TTI bundle transmissions. In this case, TBSN acts as an index of the exemplary mapping table:

| TBSN | TTI bundle number | TTI bundle pattern |
|------|-------------------|--------------------|
| 0    | 1                 | 1                  |
| 1    | 2                 | 10001              |
| 2    | 3                 | 1001001            |
| 3    | 4                 | 1011001            |
| 4    | 5                 | 11000110001        |
| ...  |                   |                    |

When the eNB 110 enables the TTI-Bundling feature, it includes the above mapping table in the RRC connection Reconfiguration message delivered to the UE 120 or when the UE 120 connects to the network node, i.e. eNB 110. Once the UE 120 receives the message and determines the TBSN from the RIV field, the UE 120 looks up the above mapping table using the TBSN as index to get the corresponding TTI bundle number as well as the scheduling TTI-bundle pattern. The UE 120 then transmits its data according to the TTI-bundle pattern, using the number of TTI bundles corresponding to the TBSN.

The purpose of multiple TTI bundles is to provide more opportunities for the UEs to transmit large data, which exceed the capacity of one TTI-bundle, via as little signaling overhead as possible. However, considering that the TTI-bundling feature is usually used in voice/video GBR scenarios, non-consecutive TTI-bundles may increase the delay and thus impact the Quality of Service (QoS). But the eNB can use the non-consecutive bundle pattern to avoid conflict with Semi Permanent Scheduling (SPS), if the consecutive TTI bundles are found to collide with other UEs' SPS.

Blind Detection

Figure 3:
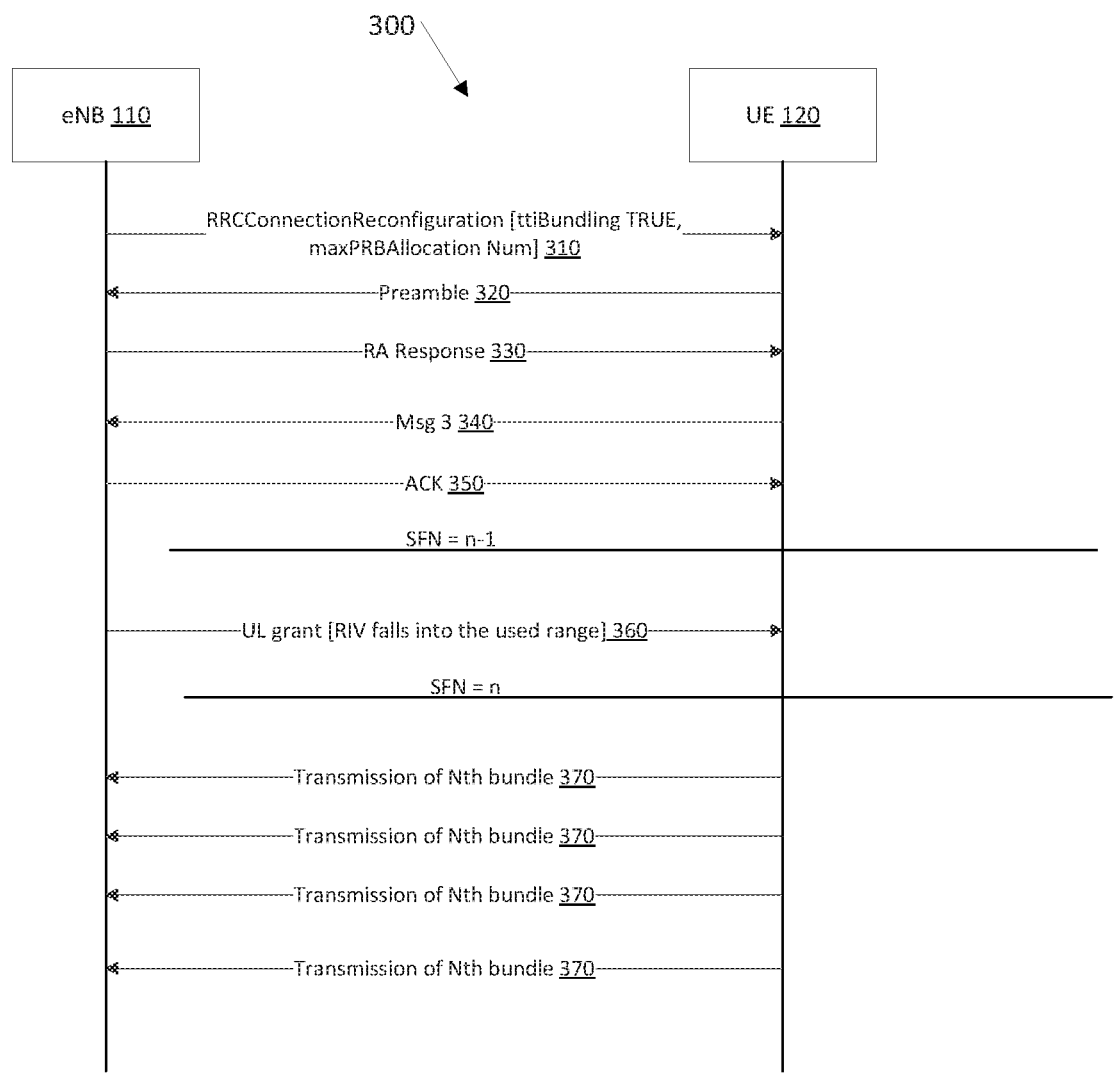
FIG. 3 illustrates an exemplary signal flow between an eNB and an UE for scheduling and transmitting TTI-bundles.
Figure 3:
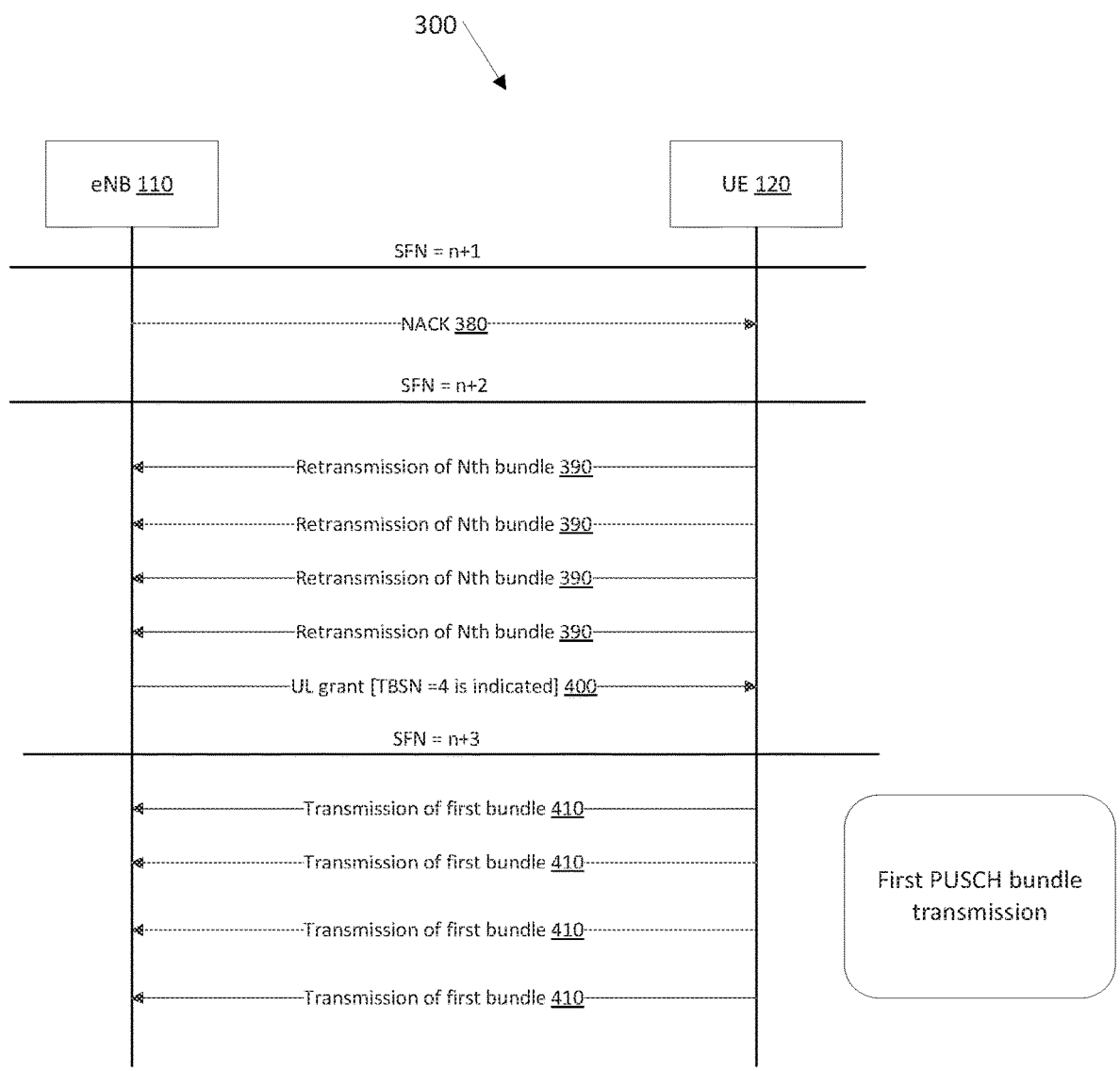
Figure 3:
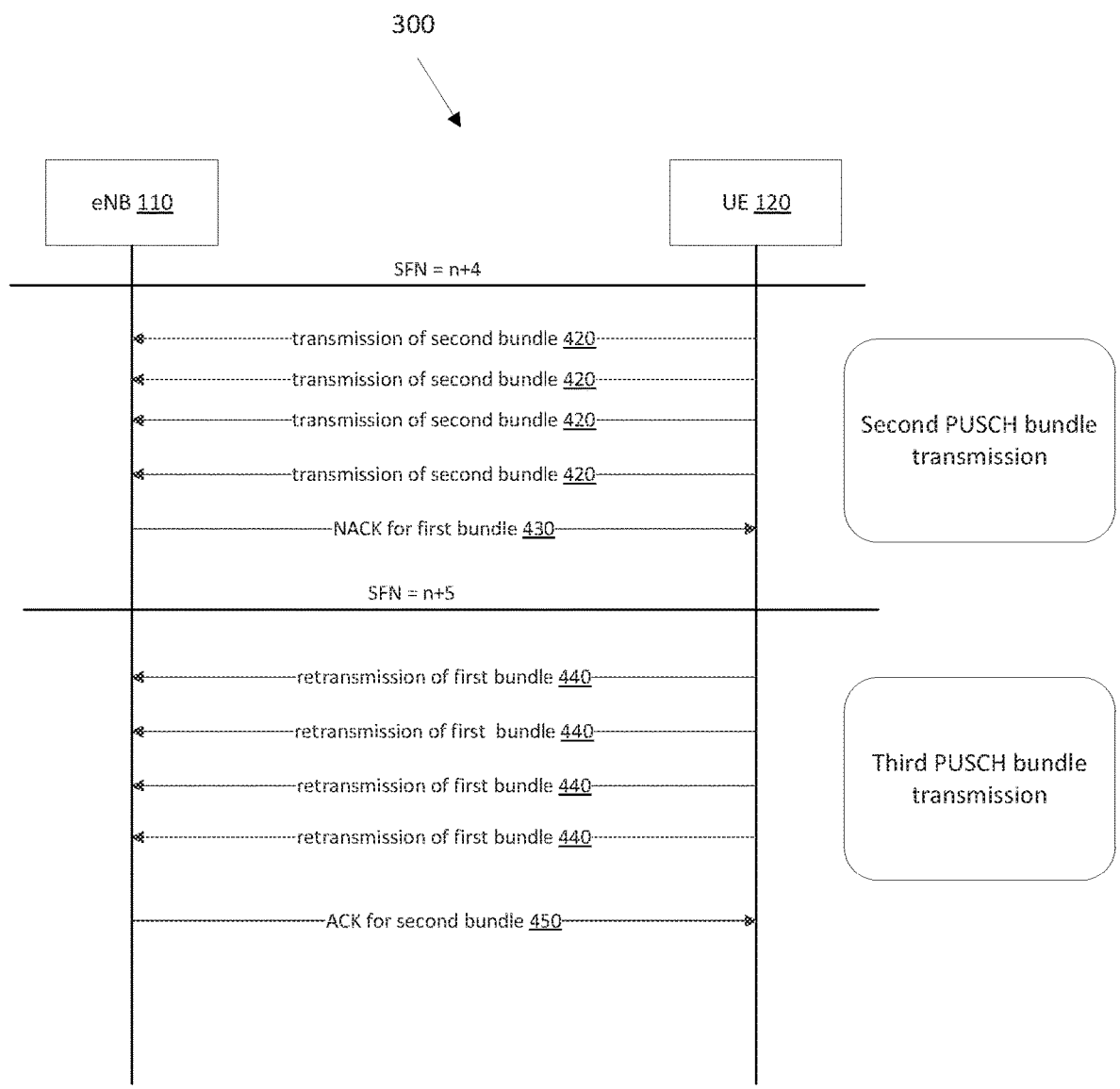
Figure 3:
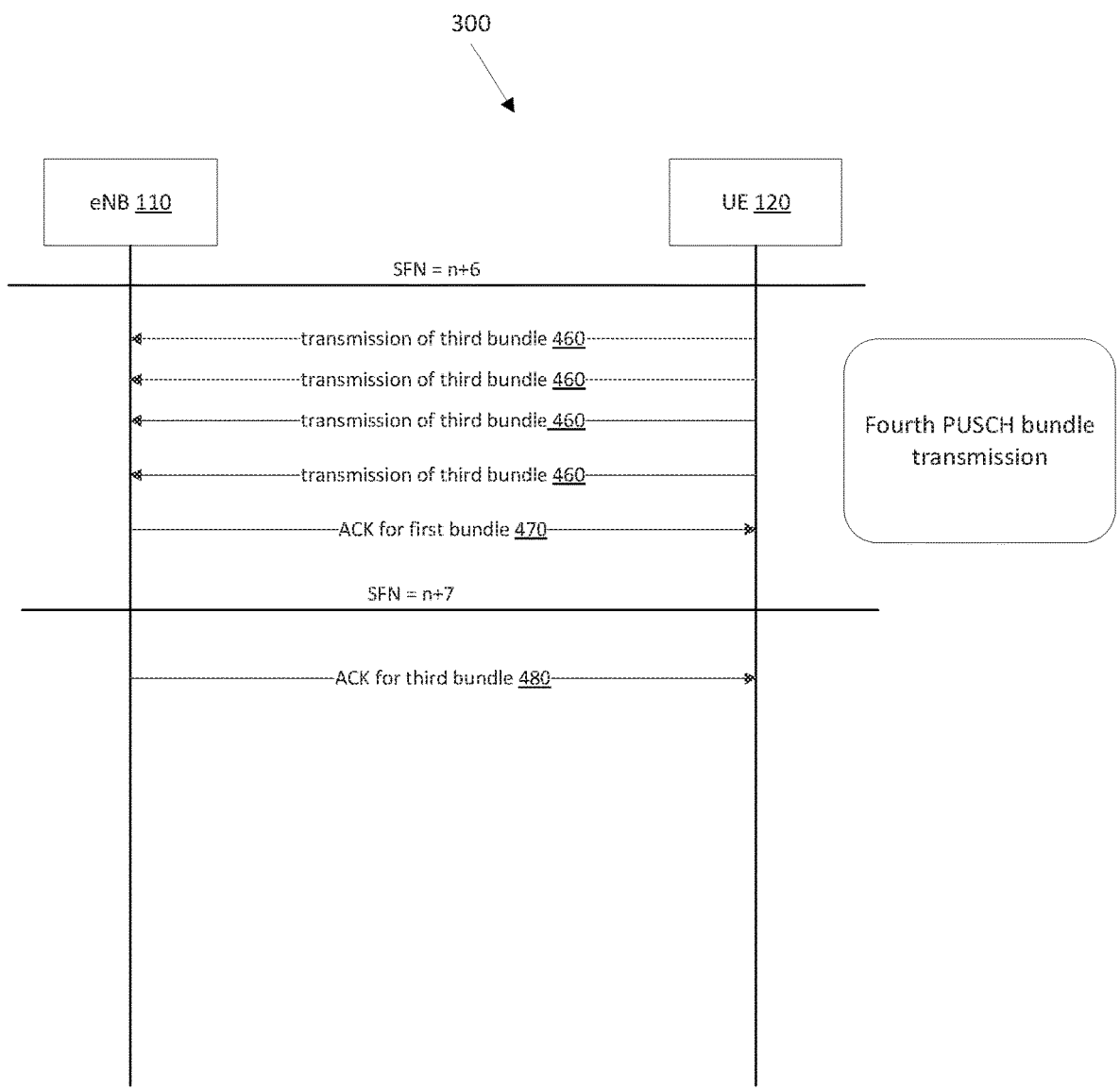

As seen in FIG. 3, a new transmission or retransmission of data is determined by a corresponding HARQ feedback in the PHICH, see for example step 430 of FIG. 3, where a NACK is received by the UE, which then retransmits the same bundled data at the next time (i.e. next SFN). The HARQ feedback provides an indication of whether the eNB received the data correctly or not, in other words, if the eNB can decode the received data correctly. However, there exists a BLock Error Rate (BLER) for the HARQ process in the PHICH, even if the probability is low (1%). Once the misinterpretation (error) occurs at the UE 120 regarding the received HARQ feedback from the eNB, it will cause a wrong reception at the eNB. In such a case, the previous TTI-bundle retransmission may collide with the next TTI-bundle for a new transmission, as shown in FIG. 10.

Figure 10:
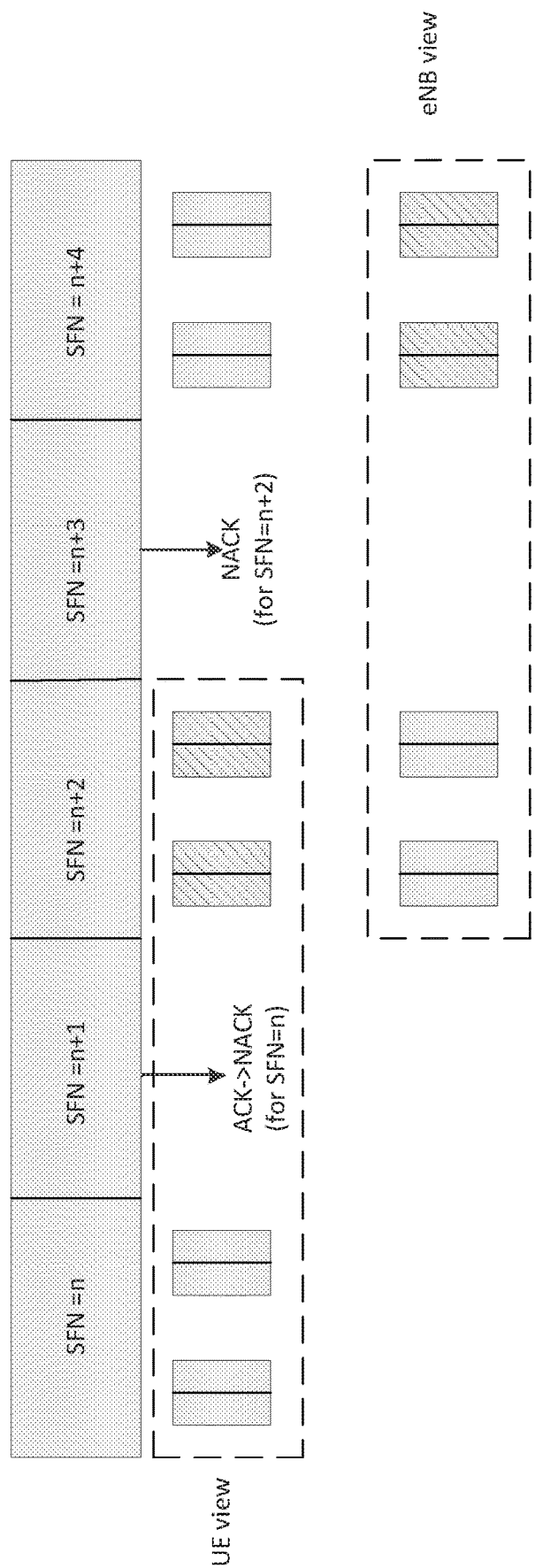
FIG. 10 illustrates an ACK to NACK misinterpretation during the transmissions of data in a communication network.

More specifically, as shown in FIG. 10, an ACK to NACK misinterpretation occurs at the UE 120 at SFN=n+1, for the TTI-bundle transmitted at SFN=n. This means that:
the decoding was successful by the eNB, at SFN=n, for the data received from the UE 120; as such the eNB 110 sends an ACK to the UE 120;
however, for different reasons, such as poor air conditions, the UE receives the HARQ feedback and decodes it as a NACK, at SFN=n+1. The NACK triggers a retransmission. Therefore, the UE retransmits the data at SFN=n+2.

When the eNB 110 receives the retransmission, it considers it as a new transmission, since the previous transmission was successfully received. As such, the decoding fails and a NACK is sent at SFN=n+3 to the UE. However, because the maximum HARQ retransmission number in the TTI-Bundle mode is limited to 2, the UE will trigger a new bundle transmission at SFN=n+4. But the eNB will recognize it as a retransmission and then will soft-combine the two independent transport blocks containing the transmitted data (the one at SFN=n+2 and the other one at SFN=n+4) to decode the received data. Clearly, the decoding will fail again.

The embodiments of the present disclosure also provide for a method to resolve the above described potential decoding failure by using a "two-step" blind detection. It is called blind detection because the decoding is performed by the eNB 110, without any input from the UE 120. As such, no additional signaling is introduced between the eNB 110 and the UE 120. The "two-step" detection allows the eNB 110 to distinguish a new transmission from a retransmission. Therefore, the eNB 110 can decode the received data correctly, even though the UE 120 may misinterpret the HARQ feedback from the PHICH.

The method can be applied in the case where the maximum of transmissions (maxHARQ-Tx) for the uplink is configured to 2. This means that only one retransmission of a TTI-Bundle is allowed. Also, the eNB 110 can decide to enable or disable the blind detection based on the max-HARQ-Tx value, without having to notify the UE 120. As such, such a method has no impact on legacy systems. For example, if maxHARQ-Tx is superior to 2, then, the two step blind detection is disabled.

In the current HARQ implementation, the receiving side (eNB or UE) always keeps a HARQ buffer for each HARQ process corresponding to a received transmission. As such, the decoded soft bits (from the transmitting side) are recorded into the HARQ buffer whether they are correctly decoded or not. The soft bits are the output of the decoding procedure. The soft bits include the original data information and the supplementary information to support decoding. The HARQ buffer records/keeps the soft bits. Each time that a retransmission of data is received, the receiving side soft-combines the received data with the content of the buffer. If a new transmission is received, the new data overrides the content of the buffer.

According to an embodiment, the eNB 110 performs the two-step blind decoding using the content of the buffer and the received data as inputs and changes an order of decoding depending on the HARQ feedback from the PHICH for the previous transmission.

Figure 11:
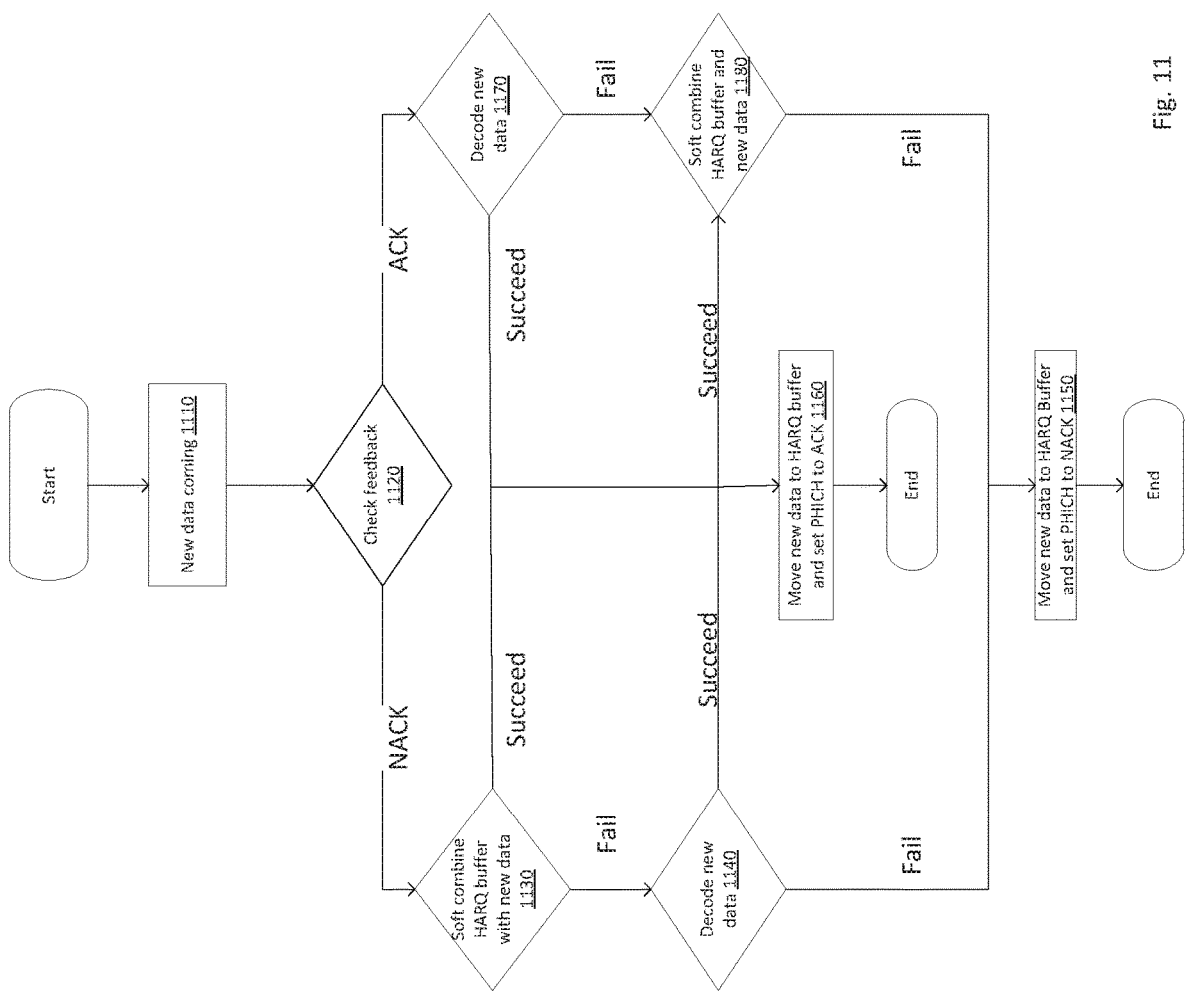
FIG. 11 illustrates a flow chart for a two-step decoding of the received data, according to an embodiment.

More specifically, FIG. 11 illustrates a flow chart for a method 1100 of blind decoding according to an embodiment. The method 1100 is carried out in the eNB 110, for example.

Method 1100 starts at block 1110 when a new transmission is received, i.e. new data is received.

The buffer content is accessible to the eNB 110. The buffer can be a HARQ buffer.

At block 1120, the eNB 110 checks the feedback on the PHICH for the previous transmission.

If it is a NACK, the eNB 110 soft-combines the content of the HARQ buffer with the data of the new transmission, at block 1130.

If the soft-combining fails, the eNB 110 decodes the new data alone, at block 1140.

If the decoding of the new data alone fails, the eNB moves the new data to the HARQ buffer and set the PHICH to NACK at block 1150. And the method ends.

If the decoding of the new data alone (block 1140) succeeds, then the eNB 110 moves the new transmission data to the HARQ buffer and set the PHICH to ACK at block 1160. And the method ends.

If the soft-combining between the HARQ buffer and the new data succeeds at block 1130, then the eNB 110 moves the new data to the HARQ Buffer and sets the PHICH to ACK, at block 1160. And the method ends.

At block 1120, the eNB checks the feedback on the PHICH for the previous transmission. If it is an ACK, it decodes the new data alone at block 1170.

If the decoding succeeds, then the eNB 110 moves the new data to the HARQ Buffer and sets the PHICH to ACK, at block 1160. And the method ends If the decoding fails, the eNB soft-combines the HARQ buffer content with the new data, at block 1180.

If the soft-combing at 1180 fails, the eNB moves the new data to the HARQ buffer and sets the PHICH to NACK at block 1150. And the method ends.

If the soft-combining at block 1180 succeeds then the eNB 110 moves the new data to the HARQ buffer and sets the PHICH to ACK at block 1160. And the method ends.

It should be noted that the two step decoding showed in the above flowchart are in sequence, but they can be also executed in parallel if processing resources allow it. In such a case, it can achieve the same time delay as in existing systems.

The method 1100 can be summarized by the following algorithm, where TB 1 refers to a first transport block of a first transmission of data in, and TB 2 refers to a second transport block of a second transmission.

In the case a HARQ ACK has been determined for the previous transmission:

Received TB 1 is independently decoded at first.

```
If (SUCCESS), then
    It's a new transmission and feedback ACK to UE in PHICH.
Else
    Perform the second decoding of TB1 with previous HARQ buffer
    If (SUCCESS)
        It's the retransmission and feedback to ACK to UE in
        PHICH
    Else
        Store TB1 into HARQ buffer to override the previous
content
    Endif
Endif
```

If both of the decodings fail, the TB1 is ambiguous and thus needs to be further checked with a subsequent Transport Block (TB2). However, since only one time retransmission is allowed for the TTI-Bundle mode, the subsequent TB2 is not related to the content of the HARQ buffer. As such, the TB 1 can always be overridden in the buffer.

In the case a HARQ NACK has been determined for the previous transmission:

Received TB1 is jointly decoded with the content of the HARQ buffer at first.

```
If (SUCCESS), then
    It's a retransmission and feedback ACK to UE in the PHICH.
Else
    Perform the second decoding of TB1 independently by itself
    If (SUCCESS)
        It's a new transmission and feedback to ACK to UE in
        PHICH
    Else
        Store TB1 into HARQ buffer to override the previous
        content
    Endif
Endif
```

If both the two decodings fail, the final step is the same, i.e. the received TB 1 overrides the content of the HARQ buffer.

For example, method 1100 can be performed in the network node 500 which has a processor 530 configured to carry out that method.

More specifically, the processor 530 is configured or adapted to, if the received data is from an initial transmission or if the feedback for a previous transmission is positive (ACK): decode the received data alone; if the decoding is successful, send a positive acknowledgement (ACK) to the UE; if the decoding fails: decode the received data together with a current content of a buffer; if the decoding is successful, determine that the received data is a retransmission and send a positive acknowledgement (ACK) to the UE; if the decoding fails, store the received data in the buffer to override the current content of the buffer and send a negative acknowledgement to the UE.

The processor 530 is further configured to, if the feedback for a previous transmission is negative (NACK): decode the received data together with a current content of a buffer; if the decoding is successful, determine that the received data is a retransmission and send a positive acknowledgement (ACK) to the UE; if the decoding fails: decode the received data alone; if the decoding is successful, determine that the received data is a new transmission and send a positive acknowledgement (ACK) to the UE; if the decoding fails, store the received data in the buffer to override the current content of the buffer and send a negative acknowledgement to the UE.

It should be noted that the current content of the buffer includes data from the previous transmission.

Even though the embodiments above have been described for cases when the number of allocated PRBs is 3, they are not restricted to such a number of PRBs. Any numbers of PRBs can be used in equation 3, for example.

Furthermore, it should be noted that because only one uplink scheduling grant is sent on the Physical Downlink Control Channel (PDCCH) for a plurality of TTI-Bundles, the CCE consumption for the scheduling signaling is decreased. As such, the problem of cell signaling capacity can be mitigated.

The embodiments are compatible with legacy systems where only one single TTI bundle is scheduled using one control message.

By scheduling a plurality of TTI-bundle transmissions, different types of traffic can be transmitted, such as voice and video.

As the trend for more and more connected devices is growing (i.e. in the Internet of Things (IoT) and Machine to Machine (2M) network), the number of terminals or devices connected to a cell is increasing as well, the number of connected devices exceeding 10000, for example. This means that the signaling overhead due to dynamic scheduling may become an important issue, as the base station needs to signal UL scheduling grants to all the connected devices. The embodiments of the present disclosure can reduce the signaling overhead significantly.

Embodiments may be represented as a software product stored in a machine-readable medium (such as the non-transitory machine readable storage media also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for transmitting data by a user equipment (UE) using a plurality of Transmission Time Interval, TTI, bundles in a communication network, the method comprising:
   receiving a single control message indicating an uplink scheduling grant for data transmissions;
   determining a number of TTI-bundles, allocated for the data transmissions of the UE in accordance with the received control message; and
   sending the data to the communication network, using the determined number of TTI-bundles,
   wherein the control message is one of a Downlink Control Information format 0 (DCI0) and DCI format 4 (DCI4), which comprises a Resource Indication Value (RIV) field, wherein the RIV field provides a TTI-bundle Scheduling Number (TBSN), which indicates the number of determined TTI-bundles and wherein the number of TTI-bundles is determined by calculating a value of the TBSN according to:

$$TBSN = \left\lfloor \frac{RIV_{rcv}}{RIV_{maxtti-b}} \right\rfloor + 1$$

where $RIV_{rcv}$ is an actual value of the RIV field in the DCI0 and $RIV_{max\ tti-b}$ is a maximum RIV value for a TTI-bundle transmission, and defined as: $RIV_{max\ tti-b} = PRB_{max}^{UL} \times PRB_{max}^{TTI-B}$, where $PRB_{max}^{UL}$ refers to a maximum number of Physical Resource Block (PRB) allocated for a uplink transmission, and $PRB_{max}^{TTI-B}$ refers to a maximum number of PRB allocated for a TTI-bundle transmission.

2. A network node for scheduling resources for a user equipment (UE) to transmit data in a communication network, the network node comprising a processing circuitry adapted to cause the network node to:
   determine a number of Transmission Time Interval (TTI)-bundles based at least on an amount of data to be transmitted from the UE; and
   send a single control message to the UE, the control message indicating an uplink scheduling grant for transmissions of the determined number of TTI-bundles,
   wherein the control message is one of a Downlink Control Information format 0 (DCI0) and DCI format 4 (DCI4), which comprises a Resource Indication Value (RIV) field, wherein the RIV field provides a TTI-bundle Scheduling Number (TBSN), which indicates the number of determined TTI-bundles and wherein the number of TTI-bundles is determined by calculating a value of the TBSN according to:

$$TBSN = \left\lfloor \frac{RIV_{rcv}}{RIV_{maxtti-b}} \right\rfloor + 1$$

where $RIV_{rcv}$ is an actual value of the RIV field in the DCI0 and $RIV_{max\ tti-b}$ is a maximum RIV value for a TTI-bundle transmission, and defined as: $RIV_{max\ tti-b} = PRB_{max}^{UL} \times PRB_{max}^{TTI-B}$, where $PRB_{max}^{UL}$ refers to a maximum number of Physical Resource Block (PRB) allocated for a uplink transmission, and $PRB_{max}^{TTI-B}$ refers to a maximum number of PRB allocated for a TTI-bundle transmission.

3. The network node of claim 2, wherein the processing circuitry is adapted to determine one of a number of consecutive TTI bundles and a number of non-consecutive TTI bundles.

4. The network node of claim 2, wherein the TBSN is provided by an unused range of values of the RIV field.

5. The network node of claim 2, wherein the processing circuitry is configured to calculate an effective RIV according to $RIV_{effective} = RIV_{rev} \bmod RIV_{max\ tti-b}$ which is used to deduce an actual PRB number and starting position for the transmission of the determined number of TTI-bundles.

6. The network node of claim 2, wherein the TBSN refers to an index of a mapping table, the mapping table providing a transmission pattern for the data transmissions of the determined number of non-consecutive TTI bundles.

7. The network node of claim 6, wherein the processing circuitry is adapted to send the mapping table to the UE when the UE attaches to the network node and when TTI-bundling is enabled.

8. The network node of claim 2, wherein the processing circuitry is adapted to blindly decode received data from one of the determined number of TTI-bundles in two steps, and wherein only one retransmission is allowed.

9. The network node of claim 8, wherein the processing circuitry is adapted to, if the received data is from an initial transmission or if a feedback for a previous transmission is positive:
   decode the received data alone;
   if the decoding is successful, send a positive acknowledgement to the UE;
   if the decoding fails:
   decode the received data together with a current content of a buffer;
   if the decoding is successful, determine that the received data is a retransmission and send a positive acknowledgement to the UE;
   if the decoding fails, store the received data in the buffer to override the current content of the buffer and send a negative acknowledgement to the UE.

10. The network node of claim 8, wherein the processing circuitry is further adapted to, if a feedback for a previous transmission is negative:
   decode the received data together with a current content of a buffer;
   if the decoding is successful, determine that the received data is a retransmission and send a positive acknowledgement to the UE;
   if the decoding fails:
   decode the received data alone;
   if the decoding is successful, determine that the received data is a new transmission and send a positive acknowledgement to the UE;

if the decoding fails, store the received data in the buffer to override the current content of the buffer and send a negative acknowledgement to the UE.

11. The network node of claim 9, wherein the current content of the buffer includes data from a previous transmission.

12. A User Equipment (UE) for transmitting data over a plurality of Transmission Time Interval, TTI, bundles in a communication network, the UE comprising a processing circuitry adapted to cause the UE to:
receive a single control message indicating an uplink scheduling grant for data transmissions;
determine a number of TTI-bundles, scheduled for the data transmissions of the UE in accordance with the received control message; and
send the data to the communication network, using the determined number of TTI-bundles,
wherein the received control message is one of a Downlink Control Information format 0 (DCI0) and DCI format 4 (DCI4), which includes a Resource Indication Value (RIV) field, wherein the RIV field provides for a TTI bundle Scheduling Number (TBSN), which indicates the number of determined TTI-bundles and wherein the number of TTI-bundles is determined by calculating a value of the TBSN according to:

$$TBSN = \left\lfloor \frac{RIV_{rcv}}{RIV_{maxtti-b}} \right\rfloor + 1$$

where $RIV_{rcv}$ is an actual value of the RIV field in the DCI0 and $RIV_{max\ tti-b}$ is a maximum RIV value for a TTI-bundle transmission, and defined as: $RIV_{max\ tti-b} = PRB_{max}^{UL} \times PRB_{max}^{TTI-B}$, where $PRB_{max}^{UL}$ refers to a maximum number of Physical Resource Block (PRB) allocated for a uplink transmission, and $PRB_{max}^{TTI-B}$ refers to a maximum number of PRB allocated for a TTI-bundle transmission.

13. The UE of claim 12, wherein the processing circuitry is further adapted to calculate an effective RIV according to $RIV_{effective} = RIV_{rev} \bmod RIV_{max\ tti-b}$, which is used to deduce an actual PRB number and starting position for the transmission of the determined number of TTI-bundles.

14. The UE of claim 12, wherein the determined number of TTI-bundles includes one of a number of consecutive TTI bundles and a number of non-consecutive TTI bundles.

15. The UE of claim 12, wherein the TBSN is given by an unused range of values of the RIV field.

16. The UE of claim 12, wherein the TBSN refers to an index of a mapping table, the mapping table providing a transmission pattern for the data transmissions of the determined number of non-consecutive TTI bundles.

17. The UE of claim 16, wherein the processing circuitry is further adapted to receive the mapping table when the UE attaches to a network node and when TTI-bundling is enabled.

* * * * *